United States Patent
Jacoby et al.

(10) Patent No.: US 10,486,269 B2
(45) Date of Patent: Nov. 26, 2019

(54) MULTI-LAYERED ALUMINIUM BRAZING SHEET MATERIAL

(71) Applicant: ALERIS ROLLED PRODUCTS GERMANY GMBH, Koblenz (DE)

(72) Inventors: Bernd Jacoby, Limburg (DE); Steven Kirkham, Ransbach-Baumbach (DE)

(73) Assignee: ALERIS ROLLED PRODUCTS GERMANY GMBH, Koblenz (DE)

( * ) Notice: Subject to any disclaimer, the term of this patent is extended or adjusted under 35 U.S.C. 154(b) by 198 days.

(21) Appl. No.: 15/552,626

(22) PCT Filed: Feb. 9, 2016

(86) PCT No.: PCT/EP2016/052679
§ 371 (c)(1),
(2) Date: Aug. 22, 2017

(87) PCT Pub. No.: WO2016/134967
PCT Pub. Date: Sep. 1, 2016

(65) Prior Publication Data
US 2018/0345420 A1    Dec. 6, 2018

(30) Foreign Application Priority Data
Feb. 23, 2015    (EP) ..................... 15156086

(51) Int. Cl.
| | |
|---|---|
| *B23K 35/02* | (2006.01) |
| *B32B 15/01* | (2006.01) |
| *C22C 21/00* | (2006.01) |
| *C22C 21/02* | (2006.01) |
| *C22C 21/16* | (2006.01) |
| *F28F 21/08* | (2006.01) |
| *B23K 35/28* | (2006.01) |

(Continued)

(52) U.S. Cl.
CPC ........ *B23K 35/0238* (2013.01); *B23K 35/288* (2013.01); *B32B 15/016* (2013.01);
(Continued)

(58) Field of Classification Search
None
See application file for complete search history.

(56) References Cited

U.S. PATENT DOCUMENTS 5,054,549 A * 10/1991 Nakaguro ............... F28F 9/18
165/133
6,555,251 B2 * 4/2003 Kilmer ............... B23K 35/0238
428/654

(Continued)

FOREIGN PATENT DOCUMENTS

DE    202013101870 U1    6/2013
EP         1430988 A1       6/2004
(Continued)

OTHER PUBLICATIONS

International Search Report and Written Opinion dated Apr. 20, 2016 for PCT/EP2016/052679 to Aleris Rolled Products Germany GMBH filed Feb. 9, 2016.

*Primary Examiner* — Daniel J. Schleis
(74) *Attorney, Agent, or Firm* — Vorys, Sater, Seymour and Pease LLP

(57) ABSTRACT

Brazing sheet material having an aluminium core alloy layer, a first brazing clad layer on one face of the core layer and an inter-layer between the core layer and the first clad layer material. The core layer of aluminium alloy including, up to 0.6% Si, up to 0.45% Fe, 0.6% to 1.25% Cu, 0.6% to 1.4% Mn, 0.08% to 0.4% Mg, up to 0.2% Cr, up to 0.25% Zr, up to 0.25% Ti, up to 0.3% Zn, balance aluminium. The first clad layer is made from 4xxx-series aluminium alloy having 6% to 14% Si and up to 2% Mg, balance aluminium. The inter-layer is made from 3xxx-series aluminium alloy including, up to 0.4% Si, up to 0.5% Fe, up to 0.8% Cu, 0.4% to 1.1% Mn, up to 0.04% Mg, up to 0.2% Cr, up to 0.25% Zr, up to 0.25% Ti, up to 0.3% Zn, balance aluminium.

18 Claims, 1 Drawing Sheet

(51) Int. Cl.
  *C22C 21/14*   (2006.01)
  *C22C 21/18*   (2006.01)
  *B23K 103/10*  (2006.01)
  *B23K 101/14*  (2006.01)

(52) U.S. Cl.
  CPC .............. *C22C 21/00* (2013.01); *C22C 21/02* (2013.01); *C22C 21/14* (2013.01); *C22C 21/16* (2013.01); *C22C 21/18* (2013.01); *F28F 21/084* (2013.01); *B23K 2101/14* (2018.08); *B23K 2103/10* (2018.08); *Y10T 428/12764* (2015.01)

(56) References Cited

U.S. PATENT DOCUMENTS

| | | | | |
|---|---|---|---|---|
| 7,648,776 | B2 * | 1/2010 | Vieregge | B23K 35/0238 228/262.51 |
| 7,811,394 | B2 * | 10/2010 | Henry | B22D 11/003 148/437 |
| 10,022,822 | B2 * | 7/2018 | Kirkham | B23K 35/286 |
| 2004/0238605 | A1 * | 12/2004 | Nishimura | B23K 35/0238 228/264 |
| 2007/0204614 | A1 * | 9/2007 | Kolb | F28D 1/0435 60/599 |
| 2011/0204124 | A1 | 8/2011 | Wittebrood | |
| 2012/0237793 | A1 * | 9/2012 | Baumann | B23K 35/0238 428/654 |
| 2015/0203934 | A1 | 7/2015 | Oskarsson et al. | |

FOREIGN PATENT DOCUMENTS

| | | |
|---|---|---|
| WO | WO03089237 * | 10/2003 |
| WO | 2004112992 A2 | 12/2004 |
| WO | 2005014274 A1 | 2/2005 |
| WO | 2014017976 A1 | 1/2014 |

\* cited by examiner

MULTI-LAYERED ALUMINIUM BRAZING SHEET MATERIAL

CROSS-REFERENCE TO RELATED APPLICATIONS

This is a § 371 National Stage Application of International Application No. PCT/EP2016/052679 filed on Feb. 9, 2016, claiming the priority of European Patent Application No. 15156086.9 filed on Feb. 23, 2015.

FIELD OF THE INVENTION

The invention relates to a multi-layered brazing sheet material having a 3xxx-series aluminium core alloy layer provided with a 4xxx-series brazing clad layer material on at least one face of said aluminium core layer and an inter-layer inter-positioned between the aluminium core alloy layer and brazing clad layer material. The invention further relates to a brazed heat exchanger comprising various components and at least one component being made from the aluminium alloy brazing sheet according to this invention.

BACKGROUND TO THE INVENTION

Substrates of aluminium or aluminium alloy in the form of sheet or extrusion, are used to make shaped or formed products. In some of these processes parts of (shaped) aluminium comprising substrates are interconnected. One end of a substrate may be interconnected with the other end or one substrate may be assembled with one or more other substrates. This is commonly done by brazing, a technique well known to the person skilled in the art. In a brazing process, a brazing filler metal or brazing alloy, or a composition producing a brazing alloy upon heating, is applied to at least one portion of the substrate to be brazed. After the substrate parts are assembled, they are heated until the brazing metal or brazing alloy melts. The melting point of the brazing material is lower than the melting point of the aluminium substrate or aluminium core sheet.

Brazing sheet products find wide applications in heat exchangers and other similar equipment. Conventional brazing products have a core of rolled sheet, typically, but not exclusively an aluminium alloy of the 3xxx-series, having on at least one surface of the core sheet an aluminium brazing clad layer. The aluminium brazing clad layer is commonly made of a 4xxx-series alloy comprising silicon in an amount in the range of 2% to 20% by weight, and preferably in the range of about 7% to 14% by weight. The aluminium brazing clad layer may be coupled or bonded to the core alloy in various ways known in the art, for example by means of roll bonding, cladding spray-forming or semi-continuous or continuous casting processes. These aluminium brazing clad layers have a liquidus temperature typically in the range of about 540° C. to 615° C.

There is a need for a further improved brazing sheet material that is sufficiently formable to produce complex shaped aluminium substrates and that can be exposed to both vacuum brazing and controlled-atmosphere brazing ("CAB") events, and achieves high levels of post-braze strength.

DESCRIPTION OF THE INVENTION

It is an object of the invention to provide a multi-layered brazing sheet material that meets this need, or at least an alternative product capable of being sufficiently formable to produce complex shaped aluminium substrates, and that can be exposed to both vacuum brazing and controlled-atmosphere brazing events, and achieves high levels of post-braze strength.

This and other objects and further advantages are met or exceeded by the present invention providing a multi-layered brazing sheet material having an aluminium core alloy layer provided with a first brazing clad layer material on one face of said aluminium core layer and an inter-layer inter-positioned between the aluminium core alloy layer and said first brazing clad layer material, wherein the core layer is made from an aluminium alloy comprising, in wt. %, up to 0.6% Si, up to 0.45% Fe, 0.6% to 1.25% Cu, 0.6% to 1.4% Mn, 0.08% to 0.4% Mg, up to 0.2% Cr, up to 0.25% Zr, up to 0.25% Ti, up to 0.3% Zn, balance aluminium and impurities, wherein the first brazing clad layer is made from a 4xxx-series aluminium alloy having 6% to 14% Si and up to 2% Mg, balance aluminium and impurities, and wherein the inter-layer is made from a 3xxx-series aluminium alloy comprising, in wt. %, up to 0.4% Si, up to 0.5% Fe, up to 0.8% Cu, 0.4% to 1.1% Mn, up to 0.04% Mg, up to 0.2% Cr, up to 0.25% Zr, up to 0.25% Ti, up to 0.3% Zn, balance aluminium and impurities.

The alloys may contain normal and inevitable impurities, typically each <0.05% and the total <0.15%, and the balance is made by aluminium.

DETAILED DESCRIPTION OF PREFERRED EMBODIMENTS

Figure 1A:
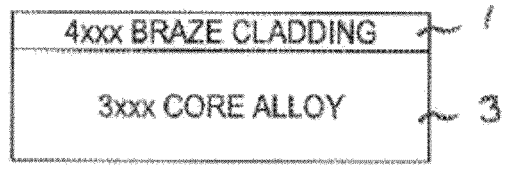
FIGS. 1a to 1d are schematic diagrams of embodiments of the multi-layered brazing sheet products used in the prior art and according to the present invention.

As will be appreciated herein below, except as otherwise indicated, aluminium alloy designations and temper designations refer to the Aluminium Association designations in Aluminium Standards and Data and the Teal Sheets Registration Record Series as published by the Aluminium Association in 2015 and frequently updated, and well known to the persons skilled in the art.

For any description of alloy compositions or preferred alloy compositions, all references to percentages are by weight percent unless otherwise indicated. The term "up to" and "up to about", as employed herein, explicitly includes, but is not limited to, the possibility of zero weight-percent of the particular alloying component to which it refers. For example, up to about 0.2% Ti may include an alloy having no Ti.

The particular 3xxx-series inter-layer controls the diffusion, in particular the Cu from the core and the Si from the brazing clad material, from the interfacial zone while maintaining a high thermal fatigue performance. The multi-layered brazing sheet material according to this invention provides a high post-braze strength, in particular a post-braze yield strength of at least 65 MPa, and more typically of at least 70 MPa. The multi-layered brazing sheet material according to this invention has a very good corrosion resistance, in particular in acidic environments, and can be subjected to cyclic temperature and pressure variations, as typically found in automotive applications (e.g. as the result of spent fuel vapour condensation), and as such, the brazing sheet material is suitable for being applied in direct air-to-air charge air cooling ("CAC") or intercooling, air-to-water CAC, water-to-air CAC, air-to-refrigerant CAC, refrigerant-to-air CAC, water-to-refrigerant condenser and evaporator whereby the 3xxx inter-layer is facing the waterside, exhaust gas cooling, exhaust gas recirculation systems, hybrid cooling system, two-phase cooling systems, tubing for radiator and heater core, plate material for battery cooling systems, etc., and forms at least an alternative product capable of extending the serviceable life of such heat exchanger units beyond the scope of performance feasible with the current art. The multi-layered brazing sheet material is producible as coil and sheet, to support mass production scale or batch scale processing, and is sufficiently formable to produce the complex shaped aluminium substrates referenced above. The multi-layered brazing sheet material is brazeable in both controlled atmosphere brazing process, either with or without the application of a brazing flux material, and vacuum brazing processes, and has high thermal stability in cyclic operation.

The specific 3xxx-series alloy used for the inter-layer provides for a better post-braze strength and corrosion resistance than an inter-layer made from a 1xxx-series aluminium alloy. The inter-layer hinders the diffusion of Mg from the core layer to the brazing clad layer. Furthermore, multi-layered brazing sheet products having a 3xxx-series inter-layer instead of a 1xxx-series inter-layer are much easier to roll bond on an industrial scale.

The Cu-content in the aluminium core alloy and the inter-layer alloy have overlapping ranges. In a preferred embodiment the Cu difference between core alloy and the inter-layer are selected such that the core alloy has the higher Cu-content than the inter-layer alloy. In the post-braze condition this gives rise to a stable Cu-gradient in the brazing sheet product and changing the local corrosion potential from the surface to the core, and thereby providing a very good corrosion resistance.

In an embodiment the 3xxx-series aluminium inter-layer alloy is made from an aluminium alloy consisting of, in wt. %: up to 0.6% Si, up to 0.45% Fe, 0.6% to 1.25% Cu, 0.6% to 1.4% Mn, 0.08% to 0.4% Mg, up to 0.2% Cr, up to 0.25% Zr, up to 0.25% Ti, up to 0.3% Zn, balance aluminium and impurities.

In a preferred embodiment the 3xxx-series aluminium core alloy is made from an aluminium alloy consisting of, in wt. %, up to 0.25% Si, up to 0.35% Fe, 0.7% to 1.1% Cu, 0.7% to 1.2% Mn, 0.1% to 0.4% Mg, up to 0.2% Cr, 0.04% to 0.25% Zr, 0.03% to 0.2% Ti, up to 0.15% Zn, balance aluminium and impurities.

In a more preferred embodiment the 3xxx-series core alloy is made from an aluminium alloy consisting of, in wt. %, up to 0.1% Si, up to 0.25% Fe, 0.75% to 1.05% Cu, 0.75% to 1.1% Mn, 0.15% to 0.35% Mg, up to 0.1% Cr, 0.04% to 0.15% Zr, 0.05% to 0.2% Ti, up to 0.1% Zn, balance aluminium and impurities.

In the core alloy the elevated Ti level is to increase the post-braze corrosion resistance of 3xxx-series alloys as is well documented in the art. The elevated Zr level is to increase the post-braze strength due to the age-hardenable characteristics of the core alloy. Also the Mg content up to 0.4%, and with preferred narrower ranges, is to increase the post-braze strength due to the age-hardenable characteristics of the core alloy. Preferred typical Mg-contents used in the core alloy are 0.25%, 0.30% or 0.35%. The age-hardenable characteristics such an ageing response of the multi-layered brazing sheet product according to this invention are favoured by increasing the cooling rate from the brazing temperature to below 100° C., and preferably to ambient temperature, of the brazed assembly incorporating for example a brazed tube made from the multi-layered brazing sheet material according to this invention at the end of a brazing cycle.

The inter-layer or inter-liner made of the 3xxx-series aluminium alloy and inter-positioned between the aluminium core alloy layer and the first brazing clad layer material has typically a thickness of about 4% to 20% of the total thickness of the multi-layered brazing sheet. Preferably the thickness is not more than 15% of the total thickness in order to enhance the rolling of the multi-layered sheet material. Preferably the thickness is at least 6% of the total thickness. The interlayer is to limit diffusion of alloying elements from the core layer to the clad brazing layer, and as such limit inter-granular corrosion propagation through the core layer in the post-braze condition, and thereby significantly improve the post-braze corrosion performance of the brazing sheet product when applied in a heat exchanger. The specific interlayer in accordance with this invention provides also a high thermal stability in cyclic operation. The specific 3xxx-series inter-layer also provides galvanic protection to the 3xxx-series core alloy.

In an embodiment the 3xxx-series aluminium inter-layer alloy is made from an aluminium alloy consisting of, in wt. %: up to 0.4% Si, up to 0.5% Fe, up to 0.8% Cu, 0.4% to 1.1% Mn, up to 0.04% Mg, up to 0.2% Cr, up to 0.25% Zr, up to 0.25% Ti, up to 0.3% Zn, balance aluminium and impurities.

In a preferred embodiment the 3xxx-series aluminium inter-layer alloy is made from an aluminium alloy consisting of, in wt. %:

up to 0.3% Si, and more preferably up to 0.2%, up to 0.5% Fe, preferably in a range of 0.15% to 0.45%, and more preferably 0.25% to 0.45%, up to 0.75% Cu, preferably 0.20% to 0.70%, and more preferably 0.40-0.70%, 0.6% to 1.1% Mn, preferably 0.7% to 1.0%, and more preferably 0.7% to 0.95%, up to 0.04% Mg, preferably up to 0.02%, such that the aluminium alloy is substantially free from Mg, up to 0.2% Cr, preferably up to 0.09%, more preferably up to 0.04%, up to 0.25% Zr, preferably up to 0.09%, more preferably up to 0.04%, up to 0.25% Ti, preferably 0.05% to 0.2%, more preferably 0.06% to 0.12%, up to 0.3% Zn, preferably up to 0.15%, more preferably up to 0.1%, balance aluminium and impurities.

Figure 1B:
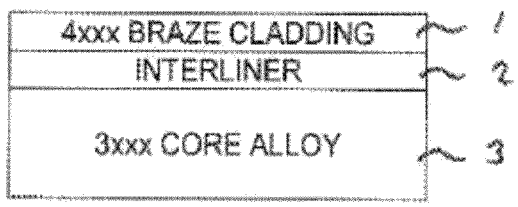
Figure 1C:
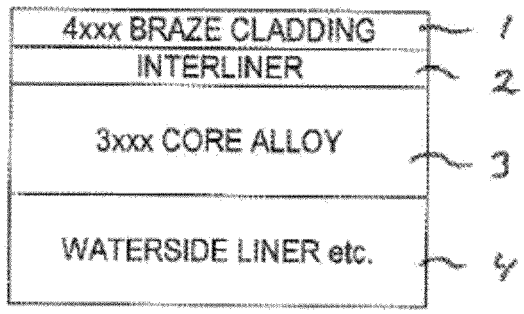
Figure 1D:
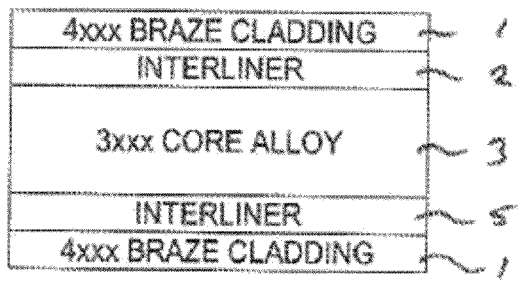

The first brazing clad liner and the optional second brazing clad liner as shown in for example FIG. 1d are each made from a 4xxx-series aluminium alloy having 6% to 14% Si and up to 0.35% Mg, ideally for use in a CAB process. Preferably the Si is up to 11%. The Mg level is preferably up to 0.10%, and more preferably up to 0.04%, such that the aluminium alloy is substantially free from Mg. The balance is made by aluminium and unavoidable impurities, which in practical terms would mean up to 0.7% Fe, up to 0.3% Mn, up to 0.25% Cu, up to 1% Zn, others each <0.05%, total <0.2%, remainder aluminium.

In an alternative embodiment the first brazing clad liner and the optional second brazing clad liner as shown in for example FIG. 1d are each made from a 4xxx-series aluminium alloy having 6% to 14% Si and up to 2% Mg, balance aluminium and impurities. Preferably the Si content is in a range of 7% to 11% Si. Preferably the Mg content is in a range of 0.4% to 2%, and more preferably 1% to 1.8% Mg, to enable the brazing sheet material to be used in a vacuum brazing process. The balance is made by aluminium and unavoidable impurities, which in practical terms would mean up to 0.7% Fe, up to 0.3% Mn, up to 0.25% Cu, up to 1% Zn, others each <0.05%, total <0.2%, remainder aluminium.

In an alternative embodiment the first brazing clad liner and the optional second brazing clad liner as shown in for example FIG. 1d are each made from a 4xxx-series aluminium alloy having 6% to 12% Si, up to 0.5% Mg, up to 0.5% Bi and/or up to 0.5% Y, ideally for use in a fluxless controlled atmosphere brazing process. Preferably the Si is up to 9%. The balance is made by aluminium and unavoidable impurities, which in practical terms would, which in practical terms would mean up to 0.7% Fe, up to 0.3% Mn, up to 0.25% Cu, up to 1% Zn, others each <0.05%, total <0.2%, remainder aluminium.

In an embodiment of the invention the multi-layered brazing sheet material consists of a 4-layered structure consisting of the following sequence of layers: first brazing clad layer, 3xxx inter-liner, core layer, and second brazing clad layer or alternatively a water-side liner or a layer providing galvanic protection to the core or the layer made from the inter-layer positioned between the core and the first brazing clad layer. In this particular 4-layered structure the 3xxx inter-liner positioned between the core and the first brazing clad layer should face the waterside when used in a cooling system, for example in a water-to-refrigerant condenser or evaporator.

In an embodiment of the invention the multi-layered brazing sheet material consists of a symmetrical 5-layered structure consisting of the following sequence of layers: a first brazing clad layer, 3xxx inter-liner, core layer, 3xxx inter-liner, and a second brazing clad layer.

The multi-layered brazing sheet material according to this invention can be manufactured via various techniques. For example by means of roll bonding as is well known in the art. Alternatively one or more of the layers can be applied onto the core alloy layer by means of thermal spraying techniques. Or alternatively the core alloy layer and inter-liner(s) can be manufactured by means of casting techniques, for example as disclosed in international patent document WO-2004/112992-A2 (Alcan) as published on 29 Dec. 2004, whereby further layers can be applied by means of for example roll bonding or thermal spraying techniques.

The multi-layered brazing sheet material according to the invention has a typical thickness at final gauge in the range of about 0.08 mm to 0.8 mm. The multi-layered brazing sheet material is preferably at least 0.1 mm thick at final gauge, and more preferably at least 0.15 mm. The multi-layered brazing sheet material is preferably not more than 0.7 mm thick at final gauge.

Each of the first brazing clad layer and the optional second brazing clad layer has typically a thickness of about 5% to 15% of the total thickness of the multi-layered brazing sheet material, for example each of about 10% or about 12.5%.

In an embodiment of the invention the core layer has been homogenised during its manufacturing route prior to hot deformation into thinner gauge material. The 3xxx-series inter-liner can be homogenised during its manufacturing route to enhance the ease of manufacturing of the multi-layered brazing sheet product according to this invention. If the 3xxx-series inter-liner is not homogenised during its manufacturing route it will improve the overall corrosion resistance of the multi-layered brazing sheet product. Typically such a homogenisation heat treatment is performed in a temperature range of 400° C. to 650° C. for a soaking time in a range of about 5 to 48 hours.

In an embodiment of the invention the brazing sheet material is provided in an O-temper, and which is fully annealed.

In an embodiment of the invention the brazing sheet material is provided in an H2x-temper or H1x-temper, and wherein x is 1, 2, 3, 4, 5, or 6. More preferably it is provided in an H24-temper. Alternatively the brazing sheet material is provided in H14-temper.

In another aspect of the invention is relates to a brazed tube made from the multi-layered brazing sheet material according to this invention acting as a fluid passage channel in a heat exchanger apparatus.

In another aspect of the invention is relates to a brazed heat exchanger comprising at least one tube made from the multi-layered brazing sheet material according to this invention. Ideally the heat exchanger is a charge-air-cooler ("CAC"). More preferably in a water-to-air CAC, in the art also known as a liquid-CAC.

The brazing sheet material is also suitable for being applied amongst others in an air-to-refrigerant CAC, air-to-air CAC, air-to-water CAC, air-to-refrigerant CAC, water-to-refrigerant condenser and evaporator whereby the 3xxx inter-layer is facing the waterside, exhaust gas cooler, exhaust gas recirculation system, hybrid cooling system, two-phase cooling system, tubing for radiator and heater core, plate material for a battery cooling system.

FIG. 1a shows a schematic diagram of a traditional brazing sheet product known in the art comprising of an aluminium core alloy (3), for example a 3xxx-series alloy, clad on one side with a 4xxx-series brazing clad layer (1).

FIG. 1b shows a schematic diagram of the multi-layered brazing sheet product comprising of a 3xxx-series aluminium core alloy (3), clad on one side with a 4xxx-series brazing clad layer (1) as described in this description, and whereby there is provided a 3xxx-series aluminium alloy inter-layer or inter-layer layer (2) inter-posed between the core layer (3) and the brazing clad layer (1).

FIG. 1c shows a schematic diagram similar to that of FIG. 1b, and whereby on the other side of the core layer (3) there is provide a layer (4) that may act as a sacrificial anode, for example a waterside liner, or a second brazing clad layer.

FIG. 1d shows a schematic diagram analogue to that of FIG. 1b, and whereby an inter-liner layer (2) and a brazing clad layer (1) are provided on each side of the core aluminium alloy layer (3).

The invention claimed is:

1. A multi-layered brazing sheet material having
an aluminium core alloy layer provided with
a first brazing clad layer material on one face of said aluminium core layer and an inter-layer inter-positioned between the aluminium core alloy layer and the first brazing clad layer material,
wherein the core layer is made from an aluminium alloy comprising, in wt. %, up to 0.6% Si, up to 0.45% Fe, 0.6% to 1.25% Cu, 0.6% to 1.4% Mn, 0.08% to 0.4% Mg, up to 0.2% Cr, up to 0.25% Zr, up to 0.25% Ti, up to 0.3% Zn, balance aluminium and impurities,
wherein the first brazing clad layer is made from an 4xxx-series aluminium alloy having 6% to 14% Si and up to 2% Mg, balance aluminium and impurities, and
wherein the inter-layer is made from an 3xxx-series aluminium alloy comprising, in wt. %, up to 0.4% Si, up to 0.5% Fe, 0.40% to 0.75% Cu, 0.4% to 1.1% Mn, up to 0.04% Mg, up to 0.2% Cr, up to 0.25% Zr, up to 0.25% Ti, up to 0.3% Zn, balance aluminium and impurities, and wherein the core layer has been homogenized.

2. The multi-layered brazing sheet material according to claim 1, wherein the Cu-content in the core alloy is higher than in the inter-layer positioned between the core alloy and the first brazing clad layer.

3. The multi-layered brazing sheet material according to claim 1, wherein the core layer is made from an aluminium alloy consisting of, in wt. %, up to 0.25% Si, up to 0.35% Fe, 0.7% to 1.1% Cu, 0.7% to 1.2% Mn, 0.1% to 0.4% Mg, up to 0.2% Cr, 0.04% to 0.25% Zr, 0.03% to 0.2% Ti, up to 0.15% Zn, balance aluminium and impurities.

4. The multi-layered brazing sheet material according to claim 1, wherein the core layer is made from an aluminium alloy consisting of, in wt. %, up to 0.1% Si, up to 0.25% Fe, 0.75% to 1.05% Cu, 0.75% to 1.1% Mn, 0.15% to 0.35% Mg, up to 0.1% Cr, 0.04% to 0.15% Zr, 0.05% to 0.2% Ti, up to 0.1% Zn, balance aluminium and impurities.

5. The multi-layered brazing sheet material according to claim 1, wherein 3xxx-series aluminium inter-layer alloy is made from an aluminium alloy consisting of, in wt. %: up to 0.3% Si, up to 0.5% Fe, 0.40% to 0.75% Cu, 0.6% to 1.1% Mn, up to 0.04% Mg, up to 0.2% Cr, up to 0.25% Zr, up to 0.25% Ti, up to 0.3% Zn, balance aluminium and impurities.

6. The multi-layered brazing sheet material according to claim 5, wherein 3xxx-series aluminium inter-layer alloy is made from an aluminium alloy having up to 0.15% Zn.

7. The multi-layered brazing sheet material according to claim 1, wherein the brazing sheet material has a post-braze yield strength of at least 65 MPa.

8. The multi-layered brazing sheet material according to claim 1, and wherein the inter-layer has a thickness of 4% to 20% of the total thick-ness of the multi-layered brazing sheet product.

9. The multi-layered brazing sheet material according to claim 1, wherein the multi-layered brazing sheet product has a total thickness in the range of 0.1 to 0.8 mm.

10. The multi-layered brazing sheet material according to claim 1, wherein the inter-liner layer has been homogenised.

11. The multi-layered brazing sheet material according to claim 1, wherein the 3xxx-series inter-liner layer is non-homogenised.

12. A multi-layered brazed tube made from the multi-layered brazing sheet material according to claim 1.

13. A heat exchanger comprising a brazed tube made from the multi-layered brazing sheet material according to claim 1.

14. A charge-air-cooler, incorporating a brazed tube made from the multi-layered brazing sheet material according to claim 1.

15. The multi-layered brazing sheet material according to claim 1, wherein 3xxx-series aluminium inter-layer alloy is made from an aluminium alloy consisting of, in wt. %: up to 0.3% Si, up to 0.5% Fe, 0.40% to 0.70% Cu, 0.6% to 1.1% Mn, up to 0.04% Mg, up to 0.2% Cr, up to 0.25% Zr, up to 0.25% Ti, up to 0.3% Zn, balance aluminium and impurities.

16. The multi-layered brazing sheet material according to claim 5, wherein 3xxx-series aluminium inter-layer alloy is made from an aluminium alloy having up to 0.1% Zn.

17. The multi-layered brazing sheet material according to claim 1, wherein the brazing sheet material has a post-braze yield strength of at least 70 MPa.

18. An air-to-water charge-air-cooler, incorporating a brazed tube made from the multi-layered brazing sheet material according to claim 1.

* * * * *